(12) United States Patent
Luthra et al.

(10) Patent No.: US 12,536,336 B2
(45) Date of Patent: Jan. 27, 2026

(54) METHOD OF APPLICATION DEPLOYMENT, APPARATUS, AND COMPUTER READABLE MEDIUM OF THE SAME

(71) Applicant: Rakuten Mobile, Inc., Tokyo (JP)

(72) Inventors: Mohit Luthra, Singapore (SG); Bharath Rathinam, Tokyo (JP); Abhishek Sharma, Tokyo (JP); Shinya Kita, Tokyo (JP); Jithin Chathankandath, Tokyo (JP); Mihir Pathak, Tokyo (JP); Amey Wadekar, Tokyo (JP); Rajasi Ahuja, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 379 days.

(21) Appl. No.: 17/564,113

(22) Filed: Dec. 28, 2021

(65) Prior Publication Data

US 2023/0205932 A1 Jun. 29, 2023

(51) Int. Cl.
*H04L 29/06* (2006.01)
*G06F 8/71* (2018.01)
(Continued)

(52) U.S. Cl.
CPC .............. *G06F 21/629* (2013.01); *G06F 8/71* (2013.01); *G06F 9/542* (2013.01); *G06F 11/302* (2013.01);
(Continued)

(58) Field of Classification Search
CPC .......... G06F 21/629; G06F 8/71; G06F 9/542; G06F 11/302; G06F 16/955; G06F 21/44; G06F 21/74; G06F 8/60; G06F 8/61; G06F 9/44505; G06F 2209/482; G06F 15/025; G06F 11/3051; G06F 2212/16; G06F 2212/17; G06F 2113/00; G06F 9/445; G06F 21/00; G06F 21/30; G06F 21/54;
(Continued)

(56) References Cited

U.S. PATENT DOCUMENTS 11,089,107 B1 * 8/2021 Chor .................. H04L 63/08
2014/0130036 A1 5/2014 Gurikar et al.
(Continued)

*Primary Examiner* — Joseph P Hirl
*Assistant Examiner* — Leynna Truvan
(74) *Attorney, Agent, or Firm* — HAUPTMAN HAM, LLP

(57) ABSTRACT

A method includes creating a first package of an application, registering the first package with an orchestrator and triggering deployment of the application on a set of target servers. In response to triggering deployment of the application, the orchestrator obtains client identification of security information for the application, deploys the application on the set of target servers, submits the configuration files to a configuration management tool for configuration, applies the configuration files to perform configuration of the application in the set of target servers, and triggers an observability framework (OBF) tool to start application monitoring in response to at least the orchestrator submitting the monitoring configurations to the OBF tool, and monitors the application in the set of target servers. The first package includes deployment files, security information, management configurations of the application, or monitoring configurations for the OBF tool.

20 Claims, 8 Drawing Sheets

100 ⟶

(51) Int. Cl.
*G06F 9/54* (2006.01)
*G06F 11/30* (2006.01)
*G06F 16/955* (2019.01)
*G06F 21/44* (2013.01)
*G06F 21/62* (2013.01)
*G06F 21/74* (2013.01)

(52) U.S. Cl.
CPC ............ *G06F 16/955* (2019.01); *G06F 21/44* (2013.01); *G06F 21/74* (2013.01)

(58) Field of Classification Search
CPC ........... G06F 21/577; G06F 2212/1052; G06F 2221/00; G06F 2212/264; G06F 2212/163; G05B 2219/39381; G05B 2219/33112; G05B 23/0208; G05B 2219/45103; G05B 2219/14124; H04L 12/2809; H04L 29/06312; H04L 29/08711; H04L 67/561; H04L 67/025; H04L 67/2804; H04L 41/0681; H04L 41/0803; H04J 13/00006; H04J 2203/0071; H04M 7/0021; H04Q 3/54575; G06G 1/0005; G02B 6/4469; G01C 21/362; G07B 2017/00056; G11B 20/00869

See application file for complete search history.

(56) References Cited

U.S. PATENT DOCUMENTS

| | | | |
|---|---|---|---|
| 2018/0167493 A1* | 6/2018 | Klemenz | H04L 67/02 |
| 2022/0116455 A1* | 4/2022 | Raghunath | H04L 41/5025 |
| 2022/0413992 A1* | 12/2022 | Nguyen | G06F 11/3428 |

* cited by examiner

METHOD OF APPLICATION DEPLOYMENT, APPARATUS, AND COMPUTER READABLE MEDIUM OF THE SAME

BACKGROUND

Network service providers and device manufacturers (e.g., wireless, cellular, etc.) are continually challenged to deliver value and convenience to consumers by, for example, providing compelling network services that are capable of being flexibly constructed, scalable and diverse.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
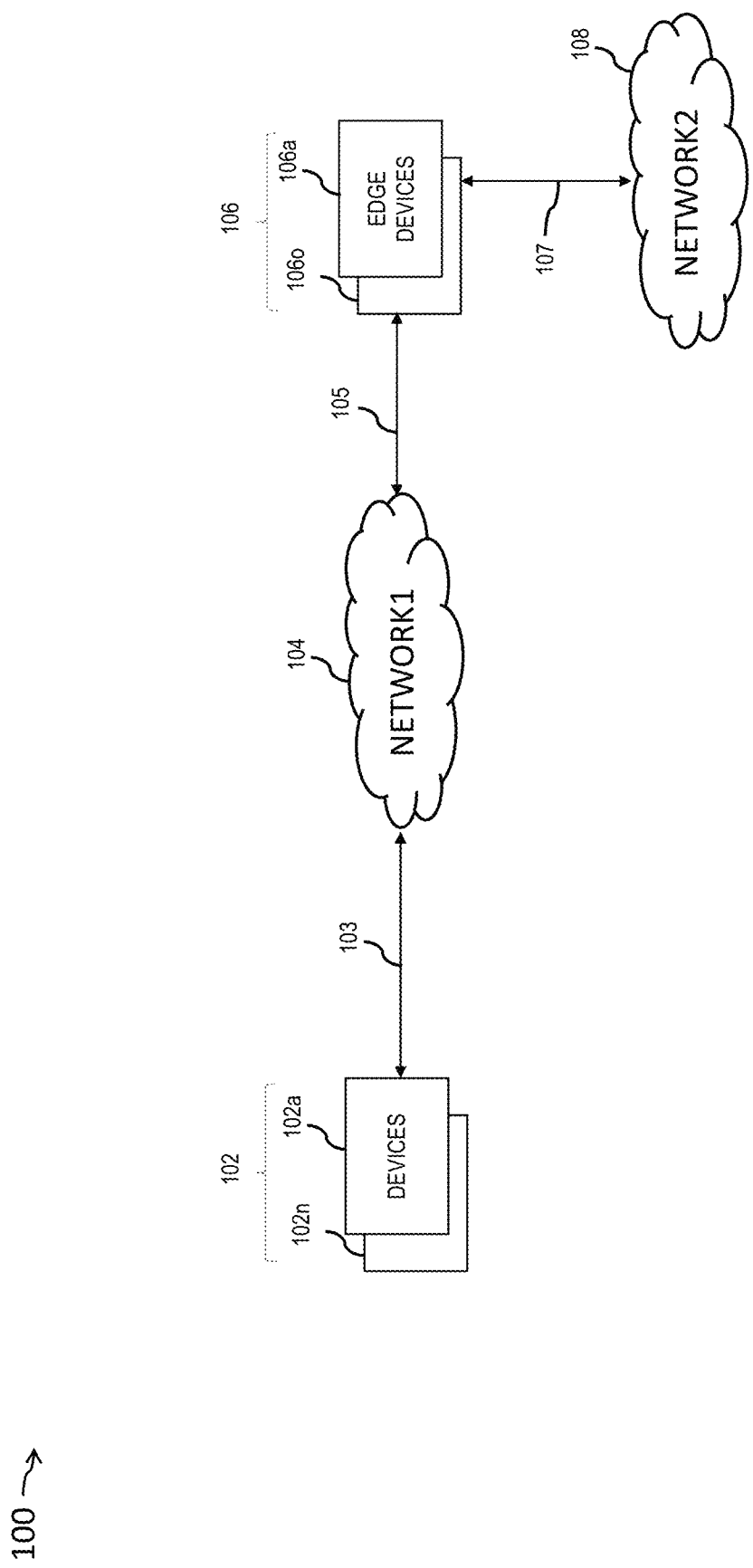
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Network service providers are challenged to provide network systems and/or network services that are capable of being flexibly constructed, scalable and diverse.

Some network systems deploy applications in various steps, and few steps are automated, and the other steps are manual. For example, when an application is placed into production, for each step, a different tool is used which makes the application deployment process very time consuming. Furthermore, the application owner passes the required configuration files to each tool manually, and the application owner also tracks each step of the process manually.

FIG. 1 is a block diagram of a communication system 100 (hereinafter referred to as "system 100"), in accordance with some embodiments.

System 100 includes a set of devices 102 coupled to a network 104 by a link 103, and the network 104 is further coupled to a set of edge devices 106 by a link 105. System 100 further includes a network 108 coupled to the set of edge devices 106 by a link 107. The set of edge devices 106 and the set of devices 102 are coupled to each other by network 104.

The set of devices 102 includes at least device 102*a*, 102*b*, . . . , 102*m* or 102*n*, where n is an integer corresponding to a number of devices in the set of devices 102. In some embodiments, one or more devices in the set of devices 102 corresponds to a computing device, a computing system or a server. In some embodiments, a device 201 (FIG. 2) corresponds to one or more devices 102*a*, 102*b*, . . . , 102*n* of the set of devices 102. In some embodiments, system 800 (FIG. 8) is an embodiment of one or more devices 102*a*, 102*b*, . . . , 102*n* of the set of devices 102. In some embodiments, the set of devices 102 corresponds to a server farm. In some embodiments, the set of devices 102 corresponds to a data center.

In some embodiments, one or more of the devices of the set of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of the devices of the set of devices 102 comprises a display by which a user interface is displayed.

Other configurations, different types of devices or other number of sets in the set of devices 102 are within the scope of the present disclosure.

The set of edge devices 106 includes at least edge device 106*a*, 106*b*, . . . , 106*n* or 106*o*, where o is an integer corresponding to a number of edge devices in the set of edge devices 106. In some embodiments, integer o is greater than integer n. In some embodiments, integer o is greater than integer n by at least a factor of 100. In some embodiments, the integer o is greater than integer n by at least a factor of 1000. Other factors are within the scope of the present disclosure.

Figure 2:
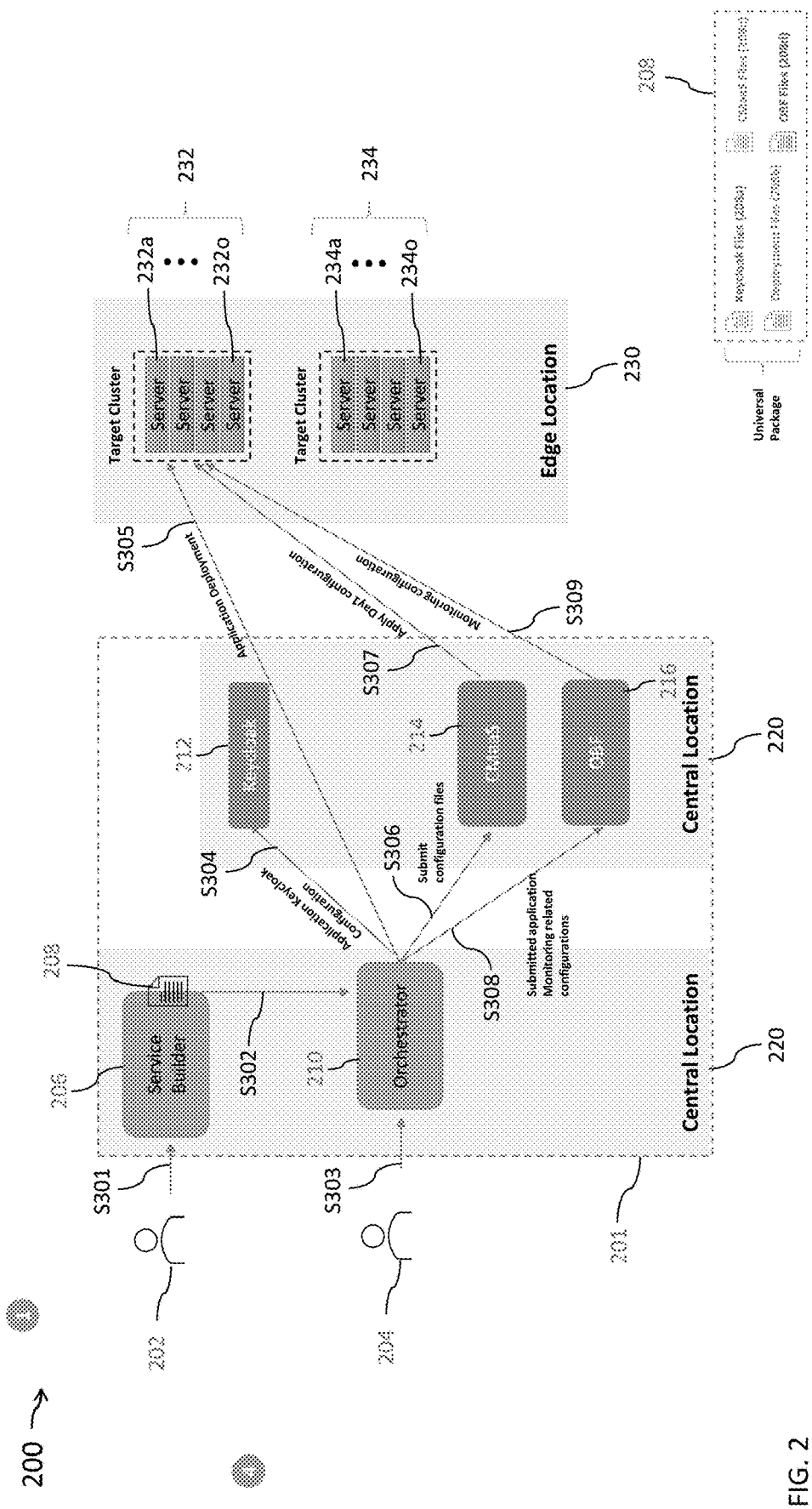
FIG. 2 is a block diagram of a system, in accordance with some embodiments.

In some embodiments, one or more edge devices in the set of edge devices 106 corresponds to a computing device, computing system or a server. In some embodiments, the set of edge devices 106 corresponds to at least a set of target servers 232 (FIG. 2) or a set of target servers 234 (FIG. 2). In some embodiments, system 800 (FIG. 8) is an embodiment of one or more edge devices 106a, 106b, . . . , 106n or 106o of the set of edge devices 106. In some embodiments, the set of edge devices 106 corresponds to a server farm. In some embodiments, the set of edge devices 106 corresponds to a data center.

Other configurations, different types of edge devices or other number of sets in the set of edge devices 106 are within the scope of the present disclosure.

In some embodiments, at least network 104 or 108 corresponds to a wired or wireless network. In some embodiments, at least network 104 or 108 corresponds to a local area network (LAN). In some embodiments, at least network 104 or 108 corresponds to a wide area network (WAN). In some embodiments, at least network 104 or 108 corresponds to a metropolitan area network (MAN). In some embodiments, at least network 104 or 108 corresponds to an internet area network (IAN), a campus area network (CAN) or a virtual private networks (VPN). In some embodiments, at least network 104 or 108 corresponds to the Internet.

Other configurations, number of networks or different types of network in at least network 104 or 108 are within the scope of the present disclosure.

In some embodiments, at least link 103, 105 or 107 is a wired link. In some embodiments, at least link 103, 105 or 107 is a wireless link. In some embodiments, at least link 103, 105 or 107 corresponds to any transmission medium type; e.g. fiber optic cabling, any wired cabling, and any wireless link type(s). In some embodiments, at least link 103, 105 or 107 corresponds to shielded, twisted-pair cabling, copper cabling, fiber optic cabling, and/or encrypted data links.

In some embodiments, at least link 103, 105 or 107 is based on different technologies, such as code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least link 103, 105 or 107 are within the scope of the present disclosure. For example, while FIG. 1 shows a single link for each of link 103, 105 or 107, one or more of links 103, 105 or 107 include a plurality of links.

Other configurations or number of elements in system 100 are within the scope of the present disclosure.

FIG. 2 is a block diagram of a system 200, in accordance with some embodiments.

System 200 is an embodiment of system 100, and similar detailed description is omitted.

System 200 includes a device 201 connected to a set of target servers 232 and a set of target servers 234. Device 201 is located at a location 220. At least the set of target servers 232 or the set of target servers 234 is located at an edge location 230. The location 220 is different from the edge location 230. In some embodiments, the location 220 is at a same location as the edge location 230. In some embodiments, location 220 is referred to as a central location.

Figure 3:
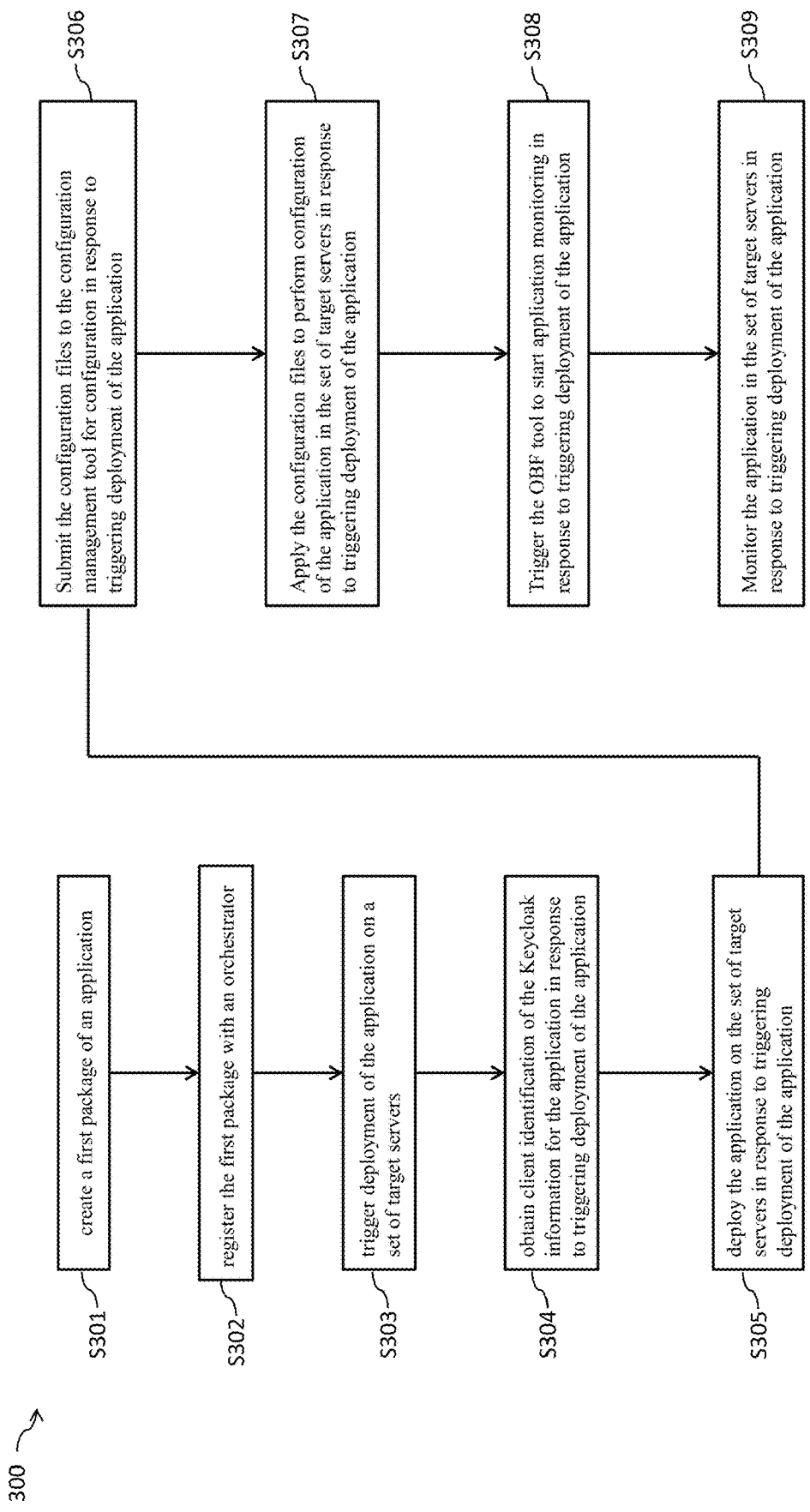
FIG. 3 is a flowchart of a method, in accordance with some embodiments.

System 200 shows a series of steps or operations (e.g., S301, S302, S303, S304, S305, S306, S307, S308 and S309), performed by system 200, and are described in FIG. 3 as method 300.

Device 201 is an embodiment of one or more devices in the set of devices 102 of FIG. 1, and similar detailed description is omitted. At least the set of target servers 232 or the set of target servers 234 is an embodiment of one or more edge devices in the set of edge devices 106 of FIG. 1, and similar detailed description is omitted. Device 201 is coupled to at least the set of target servers 232 or the set of target servers 234 by a network (not shown), such as network 104.

The set of target servers 232 includes at least target server 232a, 232b, . . . , 232s or 232t, where t is an integer corresponding to a number of servers in the set of target servers 232.

The set of target servers 234 includes at least target server 234a, 234b, . . . , 234t or 234u, where u is an integer corresponding to a number of servers in the set of target servers 234. In some embodiments, integer u is that same as integer t. In some embodiments, integer u is different from integer t.

The target servers in the set servers 232 or 234 are a logical grouping of target servers. For example, in some embodiments, the set of target servers 232 or 234 are servers located within one server device. For example, in some embodiments, the set of target servers 232 or 234 are servers located within more than one server device. While FIG. 2 shows two sets of target servers, other numbers of sets of target server 232 and 234 and other numbers of target servers within the set of target servers 232 234 are within the scope of the present disclosure.

Device 201 is configured to automatically provision and to automatically deploy one or more software applications on at least the set of target servers 232 or 234. In some embodiments, device 201 is configured to provide automatic end-to-end orchestration, deployment, configuration and management of the one or more software applications on at least the set of target servers 232 or 234. The set of target servers 232 and 234 are configured to store, execute and provide access to the one or more deployed applications by network 104 and 108 to other devices (including the set of devices 102).

Device 201 includes a service builder 206 that is configured to generate a package 208 in response to input from a user 202. The service builder 206 is configured to package the one or more software applications with the required set of configuration files and management files. In some embodiments, the service builder 206 includes a user interface where the user 202 is able to select and upload the corresponding files of the package to the device 201. In some embodiments, the service builder 206 is software stored in device 201.

The package 208 includes a series of software files useable by device 201 to automatically provision and to automatically deploy one or more software applications on at least the set of target servers 232 or 234. In some embodiments, package 208 is referred to as a "universal package." In some embodiments, the package 208 has a standardized format useable by the orchestrator 210 to automatically provision, orchestrate, manage and to deploy one or more software applications on at least the set of target servers 232 or 234 in an efficient manner. For example, the use of the standardized format of package 208 ensures that version mismatch between different files in the package 208 is avoided. In some embodiments, the package 208 has a known directory structure, and orchestrator 210 is able to extract the relevant files from package 208, and each of the files in the package 208 are able to be utilized in an efficient manner.

Package 208 includes at least Keycloak files 208*a*, deployment files 208*b*, configuration management as a service (CMaaS) files 208*c* or observability framework (OBF) files 208*d*.

Keycloak files 208*a* include security files useable by Keycloak 212. In some embodiments, Keycloak files 208*a* include identity access management (IAM) files. In some embodiments, the Keycloak files 208*a* are useable by device 201 to secure the one or more applications deployed on at least the set of target servers 232 or 234. In some embodiments, the Keycloak files 208*a* include at least kcclientregistration.yaml or keycloak.yaml. Other file types are within the scope of the present disclosure for Keycloak files 208*a*.

Deployment files 208*b* include one or more files for deployment of the one or more software applications on at least the set of target servers 232 or 234. In some embodiments, deployment files 208*b* include Helm chart data or files. In some embodiments, the Helm chart data is part of a bundle file. In some embodiments, the bundle file is, for example, a file obtained by compressing a file group having a predetermined directory structure (e.g., a file in tar.gz format). Other file types are within the scope of the present disclosure for deployment files 208*b*.

CMaaS files 208*c* include one or more configuration management files for CMaaS 214. In some embodiments, CMaaS files 208*c* include daily configuration files (discussed below in FIG. 6) used by the CMaaS 214 to configure the one or more deployed software applications. Other file types are within the scope of the present disclosure for CMaaS files 208*c*.

OBF files 208*d* include one or more observation files for OBF 216. In some embodiments, OBF files 208*d* include monitoring configuration files (discussed below in FIG. 7) used by the OBF 216 to observe and monitor the one or more deployed software applications. Other file types are within the scope of the present disclosure for OBF files 208*d*.

Orchestrator 210 is configured to receive input from a user 204 and the package 208 from service builder 206. In some embodiments, the input received from user 204 corresponds to user 204 triggering deployment of the application on at least the set of target servers 232 or 234. In some embodiments, triggering deployment of the application on at least the set of target servers 232 or 234 includes user 204 clicking a button on a screen of the orchestrator 210. In some embodiments, the button is associated with the application, and corresponds to an on-boarding button. In some embodiments, user 204 is the same as user 202. In some embodiments, user 204 is different from user 202.

Orchestrator 210 is configured to extract relevant files from the package 208, and to pass one or more of the files in the package 208 to the other parties in the ecosystem (e.g., Keycloak 212, CMaaS 214, OBF 216, set of target servers 232 and 234). In some embodiments, orchestrator 210 is configured to untarr the bundle or package 208 and identifies each of the files present inside it. In some embodiments, orchestrator 210 is configured to read the directory structure of each file in the package 208 to find out the corresponding file type.

Orchestrator 210 is configured to automatically provision and to automatically deploy one or more software applications on at least the set of target servers 232 or 234. Orchestrator 210 is also referred to as an end-to-end orchestrator (E2EO). In some embodiments, orchestrator 210 is configured to provide automatic end-to-end orchestration, configuration and management of the one or more software applications on at least the set of target servers 232 or 234. In some embodiments, the automatic end-to-end orchestration, deployment, configuration and management of each software application is characterized as a corresponding workflow. Orchestrator 210 is configured to provide automatic end-to-end orchestration, deployment, configuration and management of each software application as a corresponding workflow, and provides user 204 with each corresponding state of the automatic end-to-end orchestration, deployment, configuration and management for each software application or workflow.

In some embodiments, orchestrator 210 is configured to receive the package 208 and the triggering input from the user 204.

In response to being triggered by user 204, orchestrator 210 is configured to automatically deploy the one or more applications on at least the set of target servers 232 or 234, and distribute files from the package 208 to the other corresponding portions (e.g., Keycloak 212, CMaaS 214, OBF 216), and triggering and ensuring proper configuration of the other corresponding portions (e.g., Keycloak 212, CMaaS 214, OBF 216) in the ecosystem. For example, in some embodiments, orchestrator 210 is configured to obtain a Keycloak client identification (id), deploying the application on at least the set of target servers 232 or 234, sending configuration files to CMaaS 214 for Day-0, Day-1, Day-2 configuration or the like, and triggering OBF 216 to start application monitoring.

Orchestrator 210 is configured to maintain application states to track the overall status of the one or more applications during automated deployment and automated provisioning. In some embodiments, the example set of states for orchestrator 210 include a draft state, a Keycloak state, a deployed state, a Day-1 configuration state, a monitored state, and a failed state.

In some embodiments, the draft state includes creating the package 208 and creating the application instance by service builder 206. In some embodiments, the Keycloack state includes client identification generation and required permissions as per application in Keycloak 212. In some embodiments, the deployed state includes the application being successfully deployed or instantiated on at least the set of target servers 232 or 234. In some embodiments, the Day-1 configuration state includes the Day-1 configuration files have been successfully applied in at least the set of target servers 232 or 234. In some embodiments, the monitored state includes that OBF 216 has started monitoring the deployed application. In some embodiments, the failed state includes failure of any of the above steps or steps in method 300. Other states for orchestrator 210 are within the scope of the present disclosure.

In some embodiments, by using orchestrator 210, the end-to-end deployment of one or more applications on the set of target servers 232 and 234 is automated resulting in an end-to-end on-boarding application process that is reduced in time compared to other approaches where the application deployment is not automated.

In some embodiments, by using orchestrator 210, the end-to-end deployment of one or more applications on the set of target servers 232 and 234 is automated and able to be tested prior to application deployment resulting in less errors than other approaches where the application deployment is not automated.

In some embodiments, by using orchestrator 210, the orchestrator 210 is automatically configured to deploy and manage configuration files from a central location (e.g., the orchestrator 210) in response to being triggered by user 204 rather than other approaches where a user has to separately perform each individual step or operation for each different portion of the application deployment and management process.

Keycloak 212 is configured to send/receive Keycloak data to/from orchestrator 210. Keycloak 212 is configured to secure the one or more on-boarded applications. In some embodiments, browser applications are configured to redirect a user's browser from the application to the Keycloak authentication server where the user enters their credentials. Thus, users are isolated from the applications deployed on the set of target servers 232 or 234, and the applications do not see a user's credentials. In some embodiments, for Keycloak 212, the one or more applications are given an identity token or assertion that is cryptographically signed. In some embodiments, the tokens include identity information like username, address, email, and other profile data. In some embodiments, the tokens further include permission data so that the one or more applications are able to make authorization decisions. In some embodiments, Keycloak 212 is a separate server managed on network 104.

CMaaS 214 is configured to receive configuration files from the orchestrator 210. CMaaS 214 is configured to perform configuration of the one or more applications in the set of target servers 232 or 234 by using the configuration files. In some embodiments, the configuration files can be daily configuration files, weekly configuration files, real-time configuration files, or are types of configuration files that are updated based on user 202 or 204 setting an update frequency of the configuration files. In some embodiments, the update frequency includes any metric of time set by user 202 or 204.

OBF 216 is configured to receive the monitoring configurations from the orchestrator 210. OBF 216 is configured to monitor the one or more applications in at least the set of target servers 232 or 234. In some embodiments, OBF 216 is configured to provide status updates to the orchestrator 210 based on monitoring the application.

In some embodiments, at least service builder 208, orchestrator 210, Keycloak 212, CMaaS 214 or OBF 216 is a corresponding software module within device 201. In some embodiments, at least service builder 208, orchestrator 210, Keycloak 212, CMaaS 214 or OBF 216 is a corresponding tool within device 201. In some embodiments, one or more of service builder 208, orchestrator 210, Keycloak 212, CMaaS 214 or OBF 216 is a separate device or server located within central location 220, and the one or more separate devices communicate with each other.

Other configurations or number of elements in system 200 are within the scope of the present disclosure.

FIG. 3 is a flowchart of a method 300, in accordance with some embodiments.

In some embodiments, FIG. 3 is a flowchart of a method of operating system 100 of FIG. 1 or system 200 of FIG. 2, and similar detailed description is therefore omitted. It is understood that additional operations may be performed before, during, and/or after the method 300 depicted in FIG. 3, and that some other operations may only be briefly described herein. In some embodiments, other order of operations of method 300 is within the scope of the present disclosure. In some embodiments, one or more operations of method 300 are not performed.

Method 300 includes exemplary operations, but the operations are not necessarily performed in the order shown. Operations may be added, replaced, changed order, and/or eliminated as appropriate, in accordance with the spirit and scope of disclosed embodiments. It is understood that method 300 utilizes features of one or more of system 100, method 200B or application package configuration 300.

In operation S301 of method 300, a package 208 of an application is created. In some embodiments, package 208 is created by service builder 206 in response to input from a user 202.

In some embodiments, the package includes at least deployment files of the application, Keycloak information for the application, management configurations of the application for a configuration management tool, or monitoring configurations for monitoring the application in an observability framework (OBF) tool 216. In some embodiments, the configuration management tool includes CMaaS 214.

In operation S302 of method 300, the package 208 is registered with the orchestrator 210.

In some embodiments, operation S302 of method 300 includes reviewing the package 208 by an administrator. In some embodiments, the administrator corresponds to a user 204. In some embodiments, the administrator corresponds to a software entity. After reviewing the package, the administrator can either approve the package 208 or deny the package 208. In some embodiments, if the package 208 is approved, method 300 proceeds to operation S303. In some embodiments, if the package 208 is denied, the user 202 is able to correct any noted deficiencies of the package 208, and then operation S302 is repeated. In some embodiments, noted deficiencies of the package 208 include incorrect file types, incorrect file names, incorrect file locations within the directory structure of the package 208, insufficient file types, or the like. Other types of noted deficiencies in the package 208 are within the scope of the present disclosure.

In operation S303 of method 300, a user 204 triggers deployment of the application on at least a set of target servers 232 or 234. In some embodiments, user 204 is the same as user 202. In some embodiments, user 204 is different from user 202. In some embodiments, operation S303 includes user 204 clicking a button on a screen of the orchestrator 210, thereby triggering deployment of the application on the orchestrator 210. In some embodiments, the button is associated with the application, and corresponds to an on-boarding button.

In some embodiments, at least operation S304, S305, S306, S307, S308 or S309 occur in response to triggering deployment of the application in operation S303.

In operation S304 of method 300, the orchestrator 210 obtains client identification of the Keycloak information for the application from Keycloak 212. In some embodiments, the client identification of the Keycloak information includes identity access management (IAM) data that is extracted by orchestrator 210 from package 208. In some embodiments, the client IAM data includes at least a client type, a login page, a client name, a client description, an authorization protocol, redirect uniform resource locators (URLs) or a base URL. Other types of IAM data are within the scope of the present disclosure.

In operation S305 of method 300, the orchestrator 210 deploys the application on at least the set of target servers 232 or 234. In some embodiments, the orchestrator 210 deploys the application on at least the set of target servers 232 or 234 in response to the orchestrator 210 successfully obtaining the Keycloak information for the application.

In operation S306 of method 300, the orchestrator 210 submits the configuration files to the configuration management tool (e.g., CMaaS 214). In some embodiments, operation S306 includes triggering the CMaaS 214 to perform configuration of the application based on the configuration files. In other words, the orchestrator 210 submits the configuration files to CMaaS 214 so that CMaaS 214 is able to perform configuration of the application based on the configuration files. In some embodiments, the configuration files are daily configuration files, the orchestrator 210 submits the daily configuration files to CMaaS 214 so that CMaaS 214 is able to perform daily configuration of the application based on the daily configuration files. In some embodiments, the configuration files are weekly configuration files, the orchestrator 210 submits the weekly configuration files to CMaaS 214 so that CMaaS 214 is able to perform weekly configuration of the application based on the weekly configuration files. In some embodiments, the configuration files are real-time configuration files, the orchestrator 210 submits the real-time configuration files to CMaaS 214 so that CMaaS 214 is able to perform real-time configuration of the application based on the real-time configuration files. In some embodiments, the configuration files are updated based on the user setting the update frequency, and a configuration frequency. In some embodiments, the configuration frequency is the same as the update frequency.

In operation S307 of method 300, the configuration management tool (e.g., CMaaS 214) performs configuration of the application in the set of target servers 232 or 234 by using the configuration files. In some embodiments, the configuration files include initial configuration files and configuration files that are updated based on the update frequency of at least step S306. In some embodiments, the configuration files are updated based on a configuration frequency or update frequency. In some embodiments, the frequency includes hours, days, weeks, months, etc. In some embodiments, the frequency is real-time or set by user 202 or 204.

In operation S308 of method 300, the orchestrator 210 submits the monitoring configurations to the OBF tool 216. In some embodiments, operation S308 includes the orchestrator 210 triggering the OBF tool 216 to start application monitoring in response to at least the orchestrator 210 submitting the monitoring configurations to the OBF tool 216.

In operation S309 of method 300, the OBF tool 216 monitors the application in at least the set of target servers 232 or 234. In some embodiments, the OBF tool 216 provides status updates to the orchestrator 210 based on monitoring the application.

Figure 4:
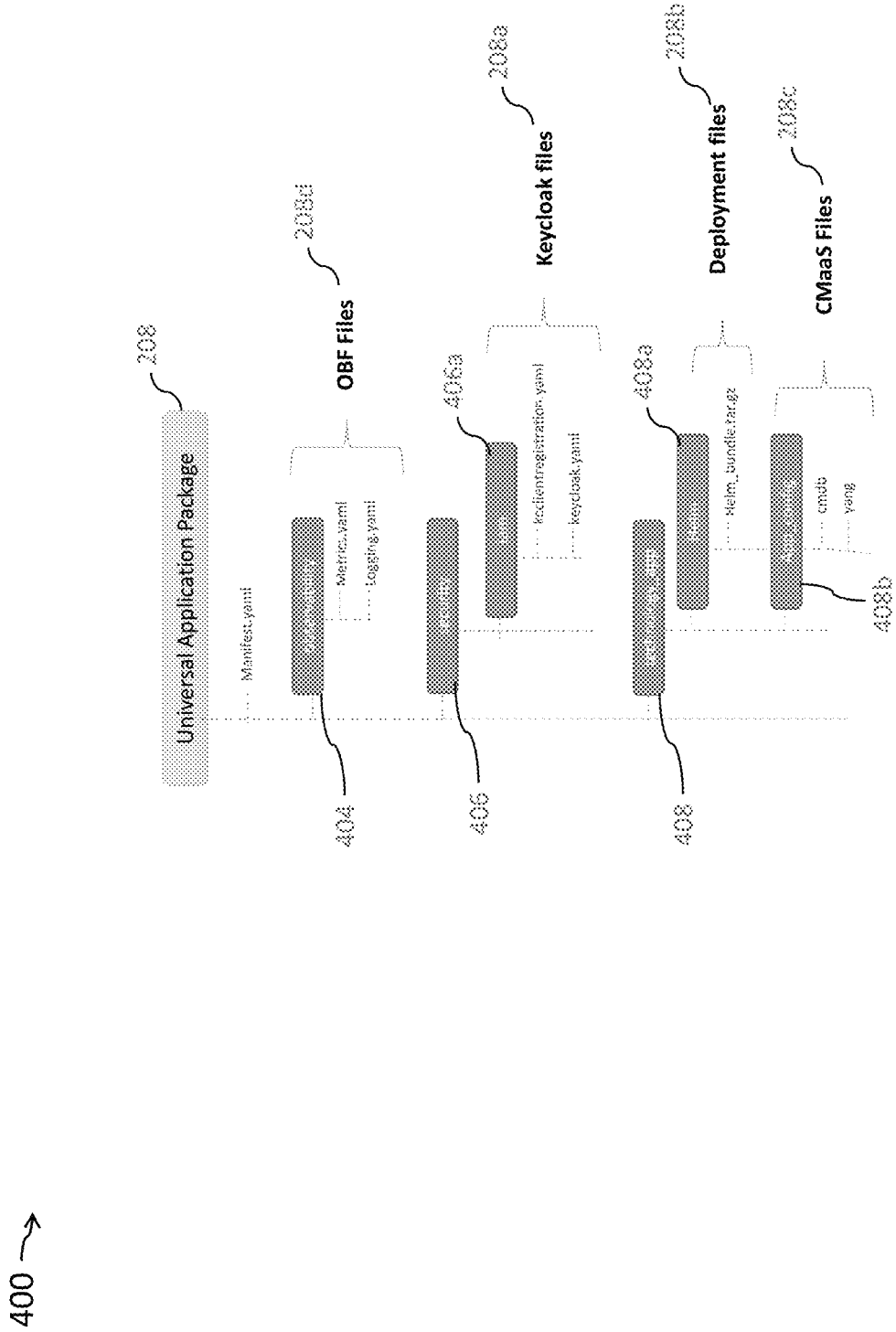
FIG. 4 is a diagram of a universal package, in accordance with some embodiments.

FIG. 4 is a diagram of a universal package 400, in accordance with some embodiments.

Universal package 400 is an embodiment of package 208, and similar detailed description is omitted.

Universal package 400 includes an observability directory 404, a security directory 406, and a technology_app directory 408. Each directory in the universal package 400 includes one or more relevant files usable by system 200.

In some embodiments, system 200 knows of the directory structure of the universal package 400, and system 200 is able to extract each of the relevant files from the universal package 400, and each of the files is utilized by system 200 in an efficient manner.

Observability directory 404 includes observation files for OBF 216. For example, the observability directory 404 includes OBF files 208*d*. In some embodiments, OBF files 208*d* include Metrics.yaml and Logging.yaml files. Other file types are within the scope of the present disclosure for OBF files 208*d*.

Security directory 406 includes security files for Keycloak 212. For example, security directory 406 includes an identity access management (IAM) sub-folder 406*a* that includes IAM files. IAM sub-folder 406*a* includes Keycloak files 208*a*. In some embodiments, the Keycloak files 208*a* include kcclientregistration.yaml and keycloak.yaml. Other file types are within the scope of the present disclosure for security directory 406.

Technology_app directory 408 includes a Helm sub-directory 408*a* and an APP_config sub-directory 408*b*. The Helm sub-directory 408*a* includes deployment files (e.g., deployment files 208*b*) for orchestrator 210 and the set of target servers 232 and 234. The APP_config sub-directory 408*b* includes configuration management files (e.g., CMaaS files 208*c*) for CMaaS 214.

The Helm 408*a* sub-directory includes deployment files 208*b*. In some embodiments, deployment files 208*b* include Helm_bundle.tar.gz files. Other file types are within the scope of the present disclosure for deployment files 208*b*.

The APP_config sub-directory 408*b* includes CMaaS files 208*c*. The CMaaS files 208*c* include Cmdb and yang file types. Other file types are within the scope of the present disclosure for CMaaS files 208*c*.

Based on the known directory structure of the universal package 400, the orchestrator 210 is able to extract the relevant files from the universal package 400, and each of the files is utilized by orchestrator 210 more efficiently than other approaches.

Other directories, sub-directories and file types for universal package 400 are within the scope of the present disclosure.

Figure 5:
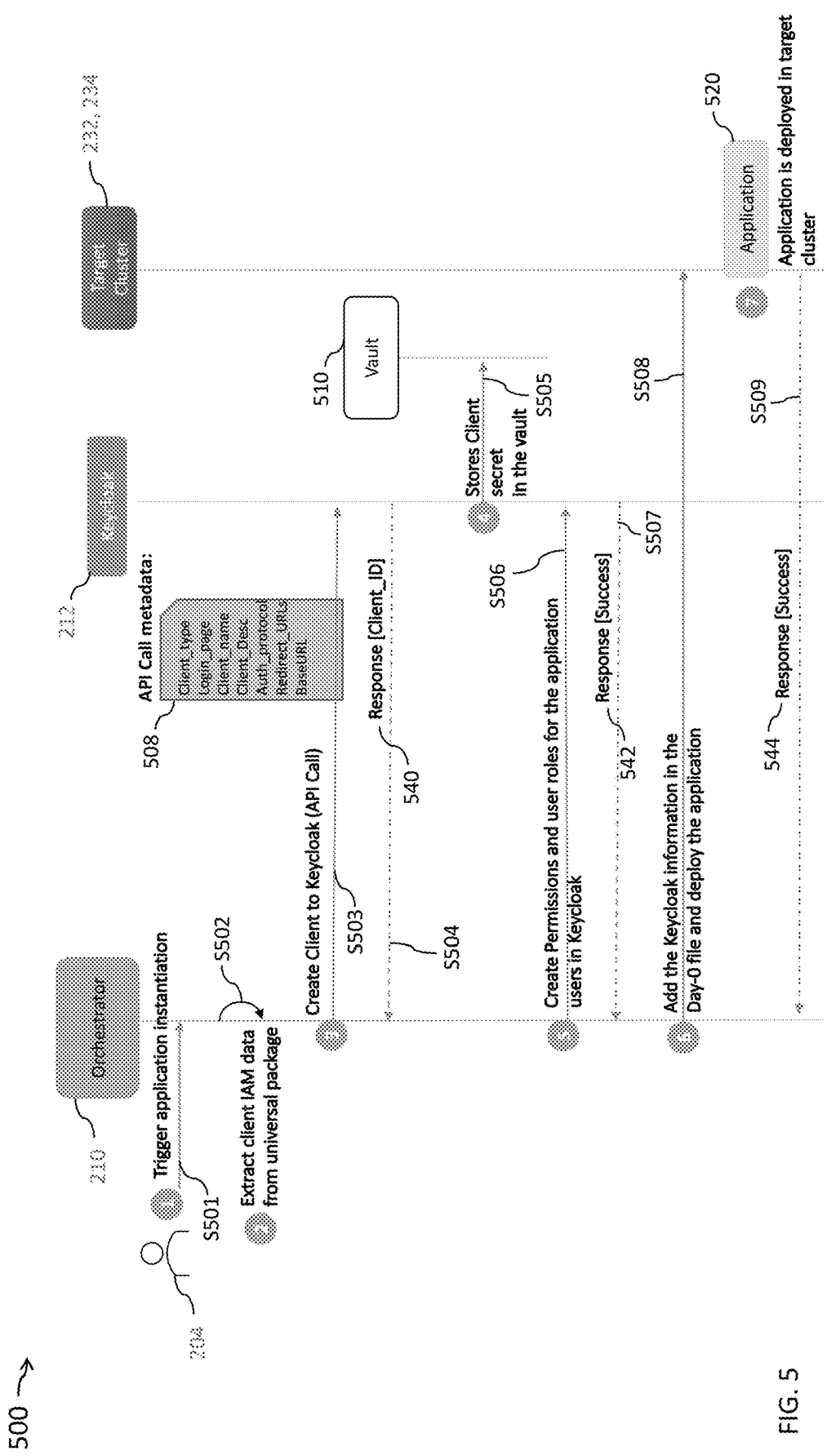
FIG. 5 is a flowchart of a method, in accordance with some embodiments.

FIG. 5 is a flowchart of a method 500, in accordance with some embodiments.

Method 500 is an embodiment of at least operations S303, S304 or S305 of method 300 of FIG. 2, and similar detailed description is therefore omitted. For example, in some embodiments, method 500 is a method of at least triggering deployment of the application on a set of target servers, obtaining client identification of the Keycloak information for the application or deploying the application on the set of target servers.

In some embodiments, FIG. 5 is a flowchart of a method of operating system 100 of FIG. 1 or device 201 of FIG. 2, and similar detailed description is therefore omitted. It is understood that additional operations may be performed before, during, and/or after the method 500 depicted in FIG. 5, and that some other operations may only be briefly described herein. In some embodiments, other order of operations of method 500 is within the scope of the present disclosure. In some embodiments, one or more operations of method 500 are not performed.

Method 500 includes exemplary operations, but the operations are not necessarily performed in the order shown. Operations may be added, replaced, changed order, and/or eliminated as appropriate, in accordance with the spirit and scope of disclosed embodiments. It is understood that method 500 utilizes features of one or more of system 100, method 300 or application package configuration 400.

In operation S501 of method 500, instantiation of the application 520 is triggered by user 204. In some embodiments, operation S501 includes user 204 clicking a button on a screen of the orchestrator 210, thereby triggering deployment of the application 520 on the orchestrator 210. In some embodiments, the button is associated with the application 520, and corresponds to an on-boarding button.

In operation S502 of method 500, client identity access management (IAM) data is extracted by orchestrator 210 from package 208. In some embodiments, the client IAM data includes at least a client type, a login page, a client name, a client description, an authorization protocol, redirect uniform resource locators (URLs) or a base URL. Other types of IAM data are within the scope of the present disclosure.

In some embodiments, at least operation S501 or S502 of method 500 is an embodiment of at least operation S303 of method 300 of FIG. 3, and similar detailed description is therefore omitted.

In operation S503 of method 500, a client is created for Keycloak by an application programming interface (API) call. In some embodiments, the API call includes metadata 508 of the client IAM data. In some embodiments, the API call includes metadata 508 of the client type, the login page, the client name, the client description, the authorization protocol, the redirect URLs or the base URL. Other types of metadata 508 are within the scope of the present disclosure.

In some embodiments, a client includes an entity that can request Keycloak to authenticate the user 204. In some embodiments, a client includes applications and services that use Keycloak to secure themselves and provide a single sign-on solution. In some embodiments, a client includes an entity that requests identity information or an access token in order to securely invoke other services on network 104 that are secured by Keycloak.

In operation S504 of method 500, a response message 540 is received by orchestrator 210. In some embodiments, the response message 540 indicates the client identification (e.g., "Client_ID"). In some embodiments, the response message 540 is sent by Keycloak 212. Other message types or numbers of messages for response message 540 are within the scope of the present disclosure.

In operation S505 of method 500, one or more client secrets are stored in a vault 510 of Keycloak 212. Operation S505 is performed by Keycloak 212.

In some embodiments, at least operation S502, S503, S504 or S505 of method 500 is an embodiment of operation S304 of method 300 of FIG. 3, and similar detailed description is therefore omitted.

In operation S506 of method 500, permissions and user roles for each corresponding user of the application 520 are created in Keycloak 212 by the orchestrator 210.

In operation S507 of method 500, a response message 542 is received by the orchestrator 210. In some embodiments, the response message 542 indicates that the permissions and user roles for each corresponding user of the application 520 in Keycloak 212 was successfully created in Keycloak 212. In some embodiments, the response message 542 is sent by Keycloak 212.

In some embodiments, one response message 542 is sent by Keycloak 212 for all users having successful permissions and user roles of the application 520 created in Keycloak 212. In some embodiments, the response message 542 is sent by Keycloak 212 for each corresponding user of the application 520 in Keycloak 212 that was successfully created in Keycloak 212. Other message types or numbers of messages for response message 542 are within the scope of the present disclosure.

In operation S508 of method 500, the Keycloak information is added to initial configuration files of the application 520, and the application 520 (and the initial configuration files of the application 520) are deployed on the set of target servers 232 or 234. In some embodiments, the initial configuration files of the application 520 are used to deploy the application 520 on the set of target servers 232 or 234.

In some embodiments, the initial configuration files of the application 520 are also referred to as "Day-0 files." In some embodiments, the day-0 files include one or more day-0 parameters. In some embodiments, day-0 parameters include host names, IP addresses, cloud-native network function data (CNFD) or the like. In some embodiments, the day-0 parameters and day-1 parameters (described below) are specific to the type of application that is deployed. In some embodiments, the day-0 parameters include at least a name, an internet protocol (IP) pool, a resource pool or a registry name. In some embodiments, the name corresponds to the application name that is used during the set-up of application deployment.

In some embodiments, the IP pool includes a default IP pool that is assigned to the deployed application, and from where micro-services of the deployed application are configured to retrieve IP addresses. In some embodiments, the default IP pool is assigned by the user 202 or 204. In some embodiments, the default IP pool is assigned by the network 104 or the set of target servers 232 or 234.

In some embodiments, the resource pool corresponds to a name of the servers in the set of target servers 232 or 234 where the application is deployed. In some embodiments, the registry name includes a docker registry name that is useable to upload application images of the deployed application.

In some embodiments, the application 520 is deployed on a single target server of the set of target servers 232 or 234. In some embodiments, the application 520 is deployed on more than one target server of the set of target servers 232 or 234.

In operation S509 of method 500, a response message 544 is received by the orchestrator 210. In some embodiments, the response message 544 indicates that the application 520 was successfully deployed on the set of target servers 232 or 234. In some embodiments, the response message 544 is sent by at least the set of target servers 232 or 234. Other message types or numbers of messages for response message 544 are within the scope of the present disclosure.

In some embodiments, at least operation S506, S507, S508 or S509 of method 500 are an embodiment of operation S205 of method 300 of FIG. 3, and similar detailed description is therefore omitted.

In some embodiments, one or more of the operations of method 500 is not performed. By utilizing method 500, one or more elements of system 100 is configured to achieve the benefits discussed above with respect to system 100 and method 300.

Figure 6:
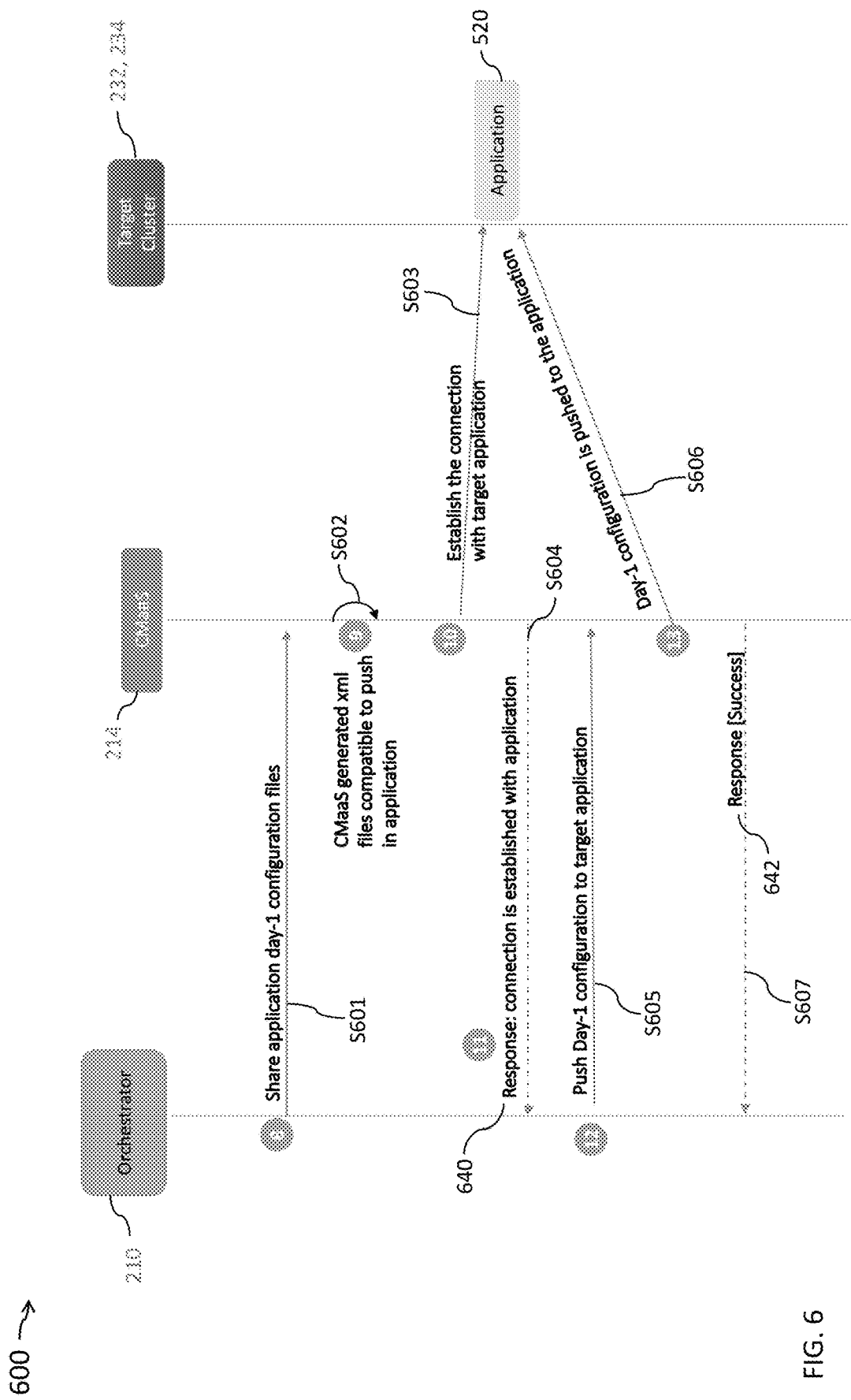
FIG. 6 is a flowchart of a method, in accordance with some embodiments.

FIG. 6 is a flowchart of a method 600, in accordance with some embodiments.

Method 600 is an embodiment of at least operations S306 or S307 of method 300 of FIG. 3, and similar detailed description is therefore omitted. For example, in some embodiments, method 600 is a method of at least the orchestrator 210 submitting the configuration files to the configuration management tool, and the configuration management tool performing the configuration of the application 520 in the set of target servers 232 or 234.

In some embodiments, FIG. 6 is a flowchart of a method of operating system 100 of FIG. 1 or device 201 of FIG. 2, and similar detailed description is therefore omitted. It is understood that additional operations may be performed before, during, and/or after the method 600 depicted in FIG. 6, and that some other operations may only be briefly described herein. In some embodiments, other order of operations of method 600 is within the scope of the present disclosure. In some embodiments, one or more operations of method 600 are not performed.

Method 600 includes exemplary operations, but the operations are not necessarily performed in the order shown. Operations may be added, replaced, changed order, and/or eliminated as appropriate, in accordance with the spirit and scope of disclosed embodiments. It is understood that method 600 utilizes features of one or more of system 100, method 300 or application package configuration 400.

In operation S601 of method 600, the configuration files are shared by orchestrator 210 with a configuration management tool (hereinafter referred to as "CMaaS 214"). In some embodiments, operation S601 includes the orchestrator 210 sending the configuration files to CMaaS 214. In some embodiments, operation S601 includes the orchestrator 210 granting authorization to the CMaaS 214 to access the configuration files.

In some embodiments, the configuration files of the application 520 include configuration files for each corresponding day that the application was deployed. For example, day-1 files are associated with the $1^{st}$ day of deployment of the application 520 on the set of target servers 232 or 234, day-2 files are associated with the $2^{nd}$ day of deployment of the application 520 on the set of target servers 232 or 234, and so forth. In some embodiments, the configuration files of the application 520 are updated based on the update frequency or configuration frequency, and method 600 is repeated for each day that the configuration files of the application 520 are updated.

In some embodiments, the configuration files of the application 520 include one or more day-1, day-2, day-3, etc. parameters. In some embodiments, day-1, day-2, day-3, etc. parameters are specific to the type of application that is deployed. For example, in a radio access network (RAN), in some embodiments, for day-1, day-2, day-3, etc. parameters include a transmit power of the signal, and a bandwidth of a signal that is transmitted by a base station or a node. In some embodiments, the transmit power is configured within the RAN, and the cell site location may use the transmit power as an initial transmit power prior to power control or other power adjustments. In some embodiments, the bandwidth corresponds to the bandwidth of transmitted.

In some embodiments, the configuration files of the application 520 include host names, IP addresses, CNFD or the like. In some embodiments, the configuration files of the application 520 correspond to iterated versions of the initial configuration files of the application 520 (e.g., Day-0 files).

In operation S602 of method 600, extensible markup language (XML) files are generated by CMaaS 214. In some embodiments, the XML files are compatible with pushing the configuration files to the application 520 (e.g., operation S606). In some embodiments, CMaaS 214 generates the XML files as part of the Push Access Protocol (PAP). Other protocols are within the scope of the present disclosure.

In operation S603 of method 600, CMaaS 214 establishes a connection with the application 520 that is deployed in the set of target servers 232 or 234. In some embodiments, by successfully establishing the connection with the application 520 that is deployed in the set of target servers 232 or 234, the CMaaS 214 is able to autonomously manage the application 520. In some embodiments, managing the application 520 includes sending the configuration files for the application 520 from a centralized system or device (e.g., device 201).

In operation S604 of method 600, a response message 640 is received by orchestrator 210. In some embodiments, the response message 640 indicates that the connection between CMaaS 214 and the application 520 was successfully established. In some embodiments, the response message 640 is sent by CMaaS 214. In some embodiments, when response message 640 indicates that the connection was successful allows the orchestrator 210 to instruct CMaaS to transfer the configuration files to the application 520.

In some embodiments, the response message 640 indicates that the connection between CMaaS 214 and the application 520 was not successfully established or unsuccessful. In these embodiments, operation S603 is repeated one or more times. In some embodiments, after the one or more failed or unsuccessful attempts to establish the connection with the application 520, CMaaS 214 sends one or more response messages 640 to orchestrator 210 that indicate the failed or unsuccessful attempts. In some embodiments, in response to response message 640 indicating failed or unsuccessful attempts to establish the connection with the application 520, orchestrator 210 may instruct the CMaaS 214 to stop trying to establish the connection with the application 520.

In some embodiments, after one or more failed or unsuccessful attempts to establish the connection with the application 520, the connection attempts may timeout and be cancelled by the CMaaS 214, and the orchestrator 210 may instruct the CMaaS 214 to attempt to retry connection to the application 520 as described above.

In some embodiments, the application 520 is deployed on a single target server of the set of target servers 232 or 234, and one response message 640 is sent by CMaaS 214 for the target server of the set of target servers 232 or 234 that has deployed the application 520.

In some embodiments, the application 520 is deployed on a single target server of the set of target servers 232 or 234. In some embodiments, the application 520 is deployed on more than one target server of the set of target servers 232 or 234, and one response message 640 is sent by CMaaS 214 for each of the target servers of the set of target servers 232 or 234 that have deployed the application 520.

In some embodiments, the application 520 is deployed on more than one target server of the set of target servers 232 or 234, and a corresponding response message 640 is sent by CMaaS 214 for each target server of the set of target servers 232 or 234 that has deployed the application 520.

Other message types or numbers of messages for response message 640 are within the scope of the present disclosure.

In some embodiments, at least operation S601, S602, S603 or S604 of method 600 are an embodiment of operation S306 of method 300 of FIG. 3, and similar detailed description is therefore omitted.

In operation S605 of method 600, the orchestrator 210 sends a push notification to the CMaaS 214. In some embodiments, operation S605 includes the orchestrator 210 sending the push notification to the CMaaS 214 in response to the receipt of response message 640, and the response message 640 indicating that the connection between CMaaS 214 and the application 520 was successfully established. In some embodiments, the push notification sent to the CMaaS 214, instructs the CMaaS to push the configuration files and the XML files to the application 520.

In operation S606 of method 600, CMaaS 214 pushes the configuration files and the XML files to the application 520 in response to the push notification sent from orchestrator 210 in operation S605.

In operation S607 of method 600, a response message 642 is received by orchestrator 210. In some embodiments, the response message 642 indicates that the configuration files were successfully pushed to the application 520. In some embodiments, the response message 642 is sent by CMaaS 214.

In some embodiments, the application 520 is deployed on a single target server of the set of target servers 232 or 234, and one response message 642 is sent by CMaaS 214 that indicates that the configuration files and the XML files have been pushed to the application 520 that is deployed by the one target server of the set of target servers 232 or 234.

In some embodiments, the application 520 is deployed on more than one target server of the set of target servers 232 or 234, and one response message 642 is sent by CMaaS 214 that indicates that the configuration files and the XML files have been pushed to the application 520 that is deployed by the plurality of target servers of the set of target servers 232 or 234.

In some embodiments, the application 520 is deployed on more than one target server of the set of target servers 232 or 234, and a corresponding response message 642 is sent by CMaaS 214 for each target server of the set of target servers 232 or 234 that has deployed the application 520 that indicates that the corresponding configuration files and the XML files have been pushed to the application 520 that is deployed by the plurality of target servers of the set of target servers 232 or 234.

Other message types or numbers of messages for response message 642 are within the scope of the present disclosure.

In some embodiments, at least operation S605, S606 or S607 of method 600 are an embodiment of operation S307 of method 300 of FIG. 3, and similar detailed description is therefore omitted.

In some embodiments, one or more of the operations of method 600 is not performed. By utilizing method 600, one or more elements of system 100 is configured to achieve the benefits discussed above with respect to system 100 and method 300.

Figure 7:
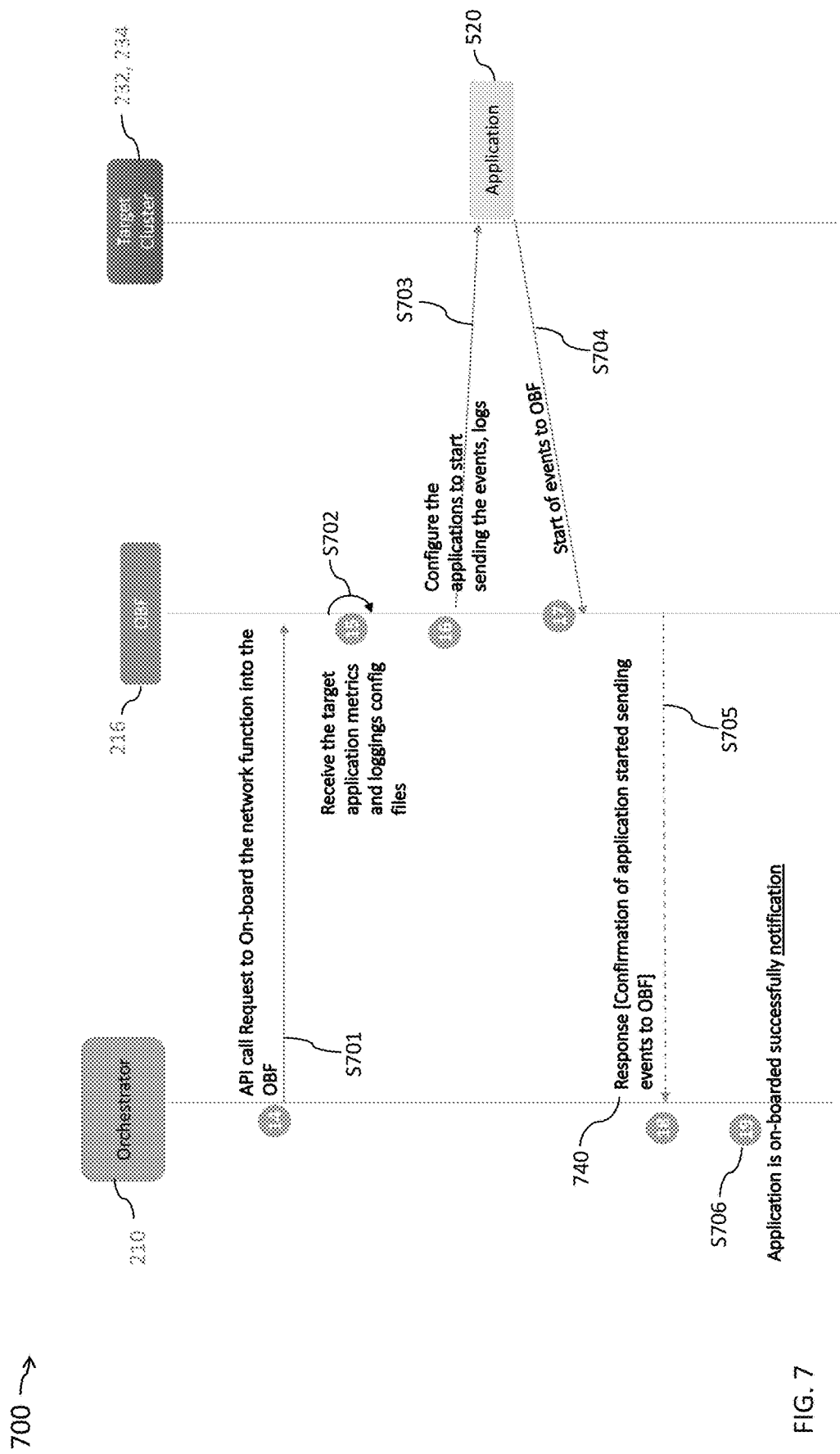
FIG. 7 is a flowchart of a method, in accordance with some embodiments.

FIG. 7 is a flowchart of a method 700, in accordance with some embodiments.

Method 700 is an embodiment of at least operations S308 or S309 of method 300 of FIG. 3, and similar detailed description is therefore omitted. For example, in some embodiments, method 700 is a method of at least the orchestrator 210 triggering the OBF tool 216 to start application monitoring in response to the orchestrator 210 submitting the daily monitoring configurations to the OBF tool 216, and the OBF tool monitoring the application 520 in the set of target servers 232 or 234 in response to being triggered by the orchestrator 210.

In some embodiments, FIG. 7 is a flowchart of a method of operating system 100 of FIG. 1 or device 201 of FIG. 2, and similar detailed description is therefore omitted. It is understood that additional operations may be performed before, during, and/or after the method 700 depicted in FIG. 7, and that some other operations may only be briefly described herein. In some embodiments, other order of operations of method 700 is within the scope of the present disclosure. In some embodiments, one or more operations of method 700 are not performed.

Method 700 includes exemplary operations, but the operations are not necessarily performed in the order shown. Operations may be added, replaced, changed order, and/or eliminated as appropriate, in accordance with the spirit and scope of disclosed embodiments. It is understood that method 700 utilizes features of one or more of system 100, method 300 or application package configuration 400.

In operation S701 of method 700, the orchestrator 210 performs an API call request to on-board one or more network functions into the OBF tool 216. In some embodiments, operation S701 includes the orchestrator 210 instructing the OBF tool 216 to monitor the application 520 based on the one or more network functions or elements.

In some embodiments, network functions or elements comprise, for example, network resources such as hardware resources associated with, or capable of being used by, a network, or software resources associated with, or capable of being used by, a network, one or more network functions, one or more network services, one or more slice subnets, one or more network slices, one or more network function-service-slice packages, one or more network function-service-slice packages and related artifacts, a slice manager, one or more servers (e.g., set of target servers 232 or 234, or edge devices 106 in FIG. 1 or some other suitable computer), one or more platform units, CMaaS manager (e.g., CMaaS 214 in FIG. 2 or some other suitable CMaaS device), a BMaaS manager, an inventory manager, a monitoring manager, an OBF tool 216 or some other suitable OBF tool), a service catalog storage/manager, a Kubernetes service cluster, other suitable cluster, a policy life cycle manager, a hardware switch, a field programmable gate array, a vRAN, a GC, an NFP, or other suitable network element and/or network resource. Other types of network functions are within the scope of the present disclosure.

In operation S702 of method 700, the OBF tool 216 retrieves at least one or more target application metrics and log-in configuration files. In some embodiments, the at least one or more target application metrics and log-in configuration files correspond to YAML configuration files utilized by the OBF tool 216 for configuration so that the OBF tool 216 is able to observe or monitor the application 520. In some embodiments, operation S702 of method 700 includes the OBF tool 216 receiving a Uniform Resource Locator (URL) of a path where at least one or more target application metrics and log-in configuration files are stored, and the OBF tool 216 retrieves/downloads the at least one or more target application metrics and log-in configuration files from the URL path.

In some embodiments, the one or more target application metrics and log-in configuration files correspond to the OBF files 408d shown in FIG. 4. In some embodiments, the one or more target application metrics correspond to the Metrics.yaml files shown in FIG. 4. In some embodiments, the one or more log-in configuration files correspond to the Logging.yaml files shown in FIG. 4.

Other types of files are generated or received by the OBF tool 216 and are within the scope of the present disclosure.

In operation S703 of method 700, the OBF tool 216 configures the application 520 to start sending at least one or more events or logs to the OBF tool 216.

In some embodiments, events or logs include one or more status updates of the application 520, or one or more workflows associated with on-boarding of the application 520. In some embodiments, the one or more workflows corresponds to a type of network element and comprises one or more of an operating system installation, an upgrade, a firmware upgrade, a change in BIOS settings, or some other suitable operation or event.

In some embodiments, at least operation S701, S702 or S703 of method 700 are an embodiment of operation S308 of method 300 of FIG. 3, and similar detailed description is therefore omitted.

In operation S704 of method 700, the OBF tool 216 receives the requested events or logs from the application 520. In some embodiments, the requested events or logs of operation S704 are sent by the set of target servers 232 or 234 that application 520 is deployed on.

In some embodiments, the application 520 is deployed on a single target server of the set of target servers 232 or 234, and the requested events or logs of operation S704 are sent by the single target server of the set of target servers 232 or 234 that application 520 is deployed on.

In some embodiments, the application 520 is deployed on more than one target server of the set of target servers 232 or 234, and the requested events or logs of operation S704 are sent by each target server of the set of target servers 232 or 234 that has deployed the application 520.

In operation S705 of method 700, the orchestrator 210 receives a response message 740. In some embodiments, the response message 740 indicates that the application 520 has started sending events to the OBF tool 216.

In some embodiments, the response message 740 is a confirmation that the OBF tool 216 has started receiving events from the application 520. In some embodiments, the response message 740 is sent by OBF tool 216.

In operation S706 of method 700, a message is displayed by the orchestrator 210 to user 204 indicating that the application 520 was on-boarded successfully.

In some embodiments, at least operation S703, S704, S705 or S706 of method 700 are an embodiment of operation S309 of method 300 of FIG. 3, and similar detailed description is therefore omitted.

In some embodiments, one or more of the operations of method 700 is not performed. By utilizing method 700, one or more elements of system 100 is configured to achieve the benefits discussed above with respect to system 100 and method 300.

Figure 8:
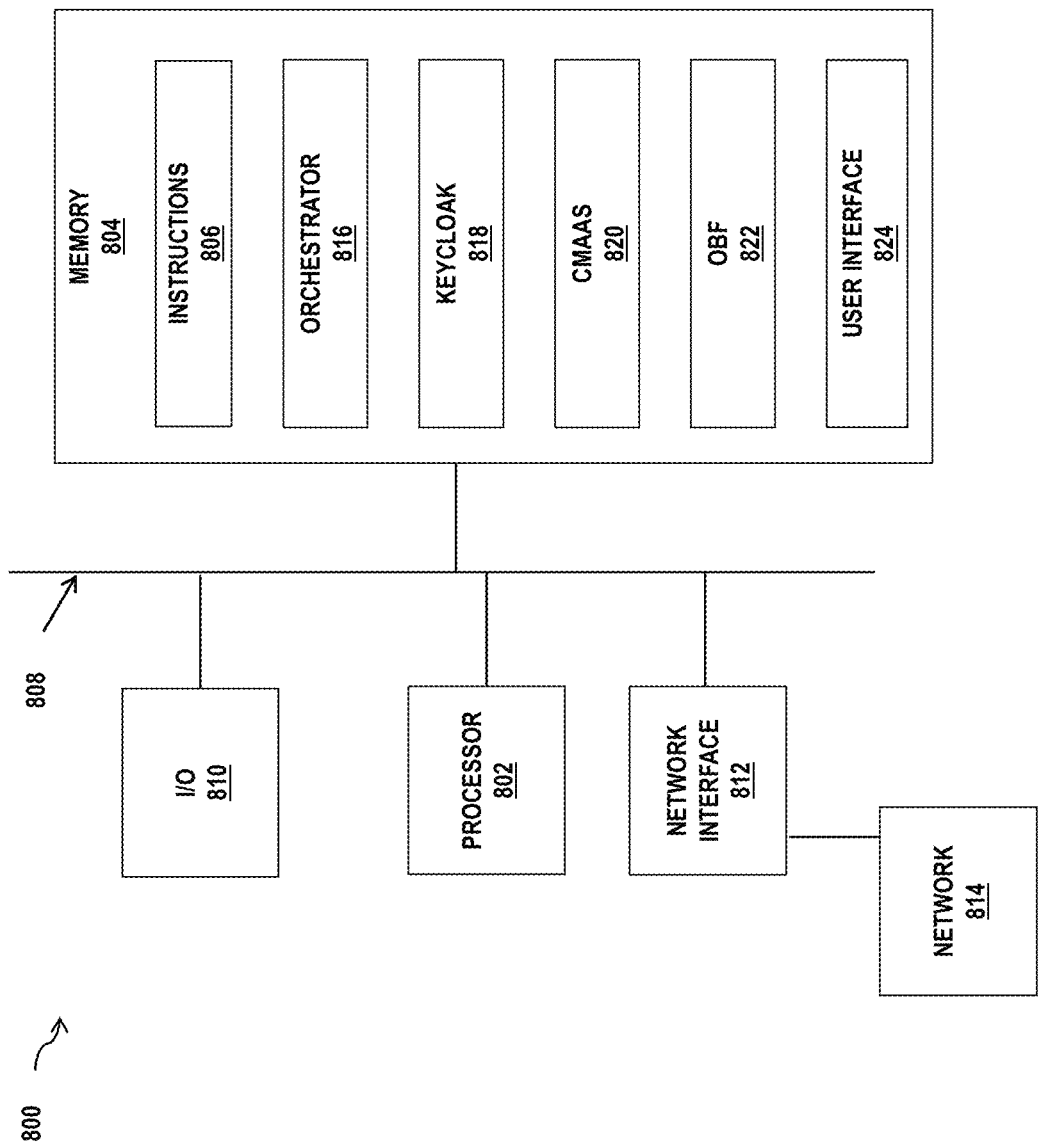
FIG. 8 is a schematic view of a system, in accordance with some embodiments.

FIG. 8 is a schematic view of a system 800, in accordance with some embodiments.

In some embodiments, system 800 is an embodiment of system 201 of FIG. 2, and similar detailed description is therefore omitted.

In some embodiments, system 800 is an embodiment of one or more elements in system 201, and similar detailed description is therefore omitted. For example, in some embodiments, system 800 is an embodiment of one or more of orchestrator 210, keycloak 212, CMaaS 214 or OBF tool 216, and similar detailed description is therefore omitted.

In some embodiments, system 800 is an embodiment of one or more devices 102 in FIG. 1, and similar detailed description is therefore omitted.

In some embodiments, system 800 is an embodiment of one or more edge devices 106 in FIG. 1 or one or more target servers of the set of target servers 232 or 234, and similar detailed description is therefore omitted.

In some embodiments, system 800 is configured to perform one or more operations of method 300, method 500, method 600 or method 700.

System 800 includes a hardware processor 802 and a non-transitory, computer readable storage medium 804 (e.g., memory 804) encoded with, i.e., storing, the computer program code 806, i.e., a set of executable instructions 806. Computer readable storage medium 804 is configured for interfacing with at least devices 102 in FIG. 1, edge devices 106 in FIG. 1, system 201, orchestrator 210, keycloak 212, CMaaS 214, OBF tool 216, or one or more target servers of the set of target servers 232 or 234.

The processor 802 is electrically coupled to the computer readable storage medium 804 by a bus 808. The processor 802 is also electrically coupled to an I/O interface 810 by bus 808. A network interface 812 is also electrically connected to the processor 802 by bus 808. Network interface 812 is connected to a network 814, so that processor 802 and computer readable storage medium 804 are capable of connecting to external elements by network 814. The processor 802 is configured to execute the computer program code 806 encoded in the computer readable storage medium 804 in order to cause system 800 to be usable for performing a portion or all of the operations as described in at least method 300, method 500, method 600 or method 700. In some embodiments, network 814 is not part of system 800. In some embodiments, network 814 is an embodiment of network 104 or 108 of FIG. 1.

In some embodiments, the processor 802 is a central processing unit (CPU), a multi-processor, a distributed processing read circuit, an application specific integrated circuit (ASIC), and/or a suitable processing unit.

In some embodiments, the computer readable storage medium 804 is an electronic, magnetic, optical, electromagnetic, infrared, and/or a semiconductor read circuit (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, the storage medium 804 stores the computer program code 806 configured to cause system 800 to perform one or more operations of at least method 300, method 500, method 600 or method 700. In some embodiments, the storage medium 804 also stores information used for performing at least method 300, method 500, method 600 or method 700 as well as information generated during performing at least method 300, method 500, method 600 or method 700, such as orchestrator 816, Keycloak 818, CMaaS 820, OBF 822 and user interface 824, and/or a set of executable instructions to perform one or more operations of at least method 300, method 500, method 600 or method 700.

In some embodiments, the storage medium 804 stores instructions (e.g., computer program code 806) for interfacing with at least devices 102 in FIG. 1, edge devices 106 in FIG. 1, system 201, orchestrator 210, keycloak 212, CMaaS 214, OBF tool 216, or one or more target servers of the set of target servers 232 or 234. The instructions (e.g., computer program code 806) enable processor 802 to generate instructions readable by at least devices 102 in FIG. 1, edge devices 106 in FIG. 1, system 201, orchestrator 210, keycloak 212, CMaaS 214, OBF tool 216, or one or more target servers of the set of target servers 232 or 234 to effectively implement one or more operations of at least method 300, method 500, method 600 or method 700 during operation of system 201.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802

System 800 also includes network interface 812 coupled to the processor 802. Network interface 812 allows system 800 to communicate with network 814, to which one or more other computer read circuits are connected. Network interface 812 includes wireless network interfaces such as BLUETOOTH, WIFI, WIMAX, GPRS, or WCDMA; or wired network interface such as ETHERNET, USB, or IEEE-884. In some embodiments, at least method 300, method 500, method 600 or method 700 is implemented in two or more systems 800, and information such as orchestrator, Keycloak, CMaaS, OBF and user interface are exchanged between different systems 800 by network 814.

System 800 is configured to receive information related to an orchestrator through I/O interface 810 or network interface 812. The information is transferred to processor 802 by bus 808, and is then stored in computer readable medium 804 as orchestrator 816. In some embodiments, orchestrator 816 corresponds to orchestrator 210, and similar detailed description is therefore omitted. System 800 is configured to receive information related to Keycloak through I/O interface 810 or network interface 812. The information is stored in computer readable medium 804 as Keycloak 818. In some embodiments, Keycloak 818 corresponds to Keycloak 212, and similar detailed description is therefore omitted. System 800 is configured to receive information related to a CMaaS through I/O interface 810 or network interface 812. The information is stored in computer readable medium 804 as CMaaS 820. In some embodiments, CMaaS 820 corresponds to CMaaS 214, and similar detailed description is therefore omitted. System 800 is configured to receive information related to an OBF through I/O interface 810 or network interface 812. The information is stored in computer readable medium 804 as OBF 822. In some embodiments, OBF 822 corresponds to OBF 216, and similar detailed description is therefore omitted. System 800 is configured to receive information related to a user interface through I/O interface 810 or network interface 812. The information is stored in computer readable medium 804 as user interface 824.

In some embodiments, at least method 300, method 500, method 600 or method 700 is implemented as a standalone software application for execution by a processor. In some embodiments, at least method 300, method 500, method 600 or method 700 is implemented as corresponding software applications for execution by one or more processors.

In some embodiments, at least method 300, method 500, method 600 or method 700 is implemented as a software application that is a part of an additional software application. In some embodiments, at least method 300, method 500, method 600 or method 700 is implemented as a plug-in to a software application.

In some embodiments, at least method 300, method 500, method 600 or method 700 is implemented as a software application that is a portion of an orchestrator tool. In some embodiments, at least method 300, method 500, method 600 or method 700 is implemented as a software application that is used by an orchestrator tool. In some embodiments, the orchestrator tool is used to orchestrator deployment of one or more software applications to a set of target servers.

In some embodiments, one or more of the operations of method 300, 400, 500, 600 or 700 is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method. In some embodiments, the method includes creating, by a first processor, a first package of an application, the first package including at least deployment files of the application, Keycloak information for the application, daily management configurations of the application for a configuration management tool, or daily monitoring configurations for monitoring the application in an observability framework (OBF) tool. In some embodiments, the method further includes registering the first package with an orchestrator, triggering, by a user, deployment of the application on a set of target servers, and in response to triggering deployment of the application, the orchestrator: obtaining client identification of the Keycloak information for the application, deploying the application on the set of target servers, submitting the daily configuration files to the configuration management tool for daily configuration, and applying, by the configuration management tool, the daily configuration files to perform daily configuration of the application in the set of target servers, and triggering the OBF tool to start application monitoring in response to at least the orchestrator submitting the daily monitoring configurations to the OBF tool, and monitoring, by the OBF tool, the application in the set of target servers.

Another aspect of this description relates to a system. In some embodiments, the system includes a memory having non-transitory instructions stored, and a processor coupled to the memory, and being configured to execute the instructions, thereby causing the apparatus to: create a first package of an application, the first package including at least deployment files of the application, Keycloak information for the application, daily management configurations of the application for a configuration management tool, or daily monitoring configurations for monitoring the application in an observability framework (OBF) tool, register the first package with an orchestrator, trigger deployment of the application on a set of target servers, and in response to triggering deployment of the application, the orchestrator being configured to: obtain client identification of the Keycloak information for the application, deploy the application on the set of target servers, submit the daily configuration files to the configuration management tool for daily configuration, and apply, by the configuration management tool, the daily configuration files to perform daily configuration of the application in the set of target servers, and trigger the OBF tool to start application monitoring in response to the orchestrator submitting the daily monitoring configurations to the OBF tool, and monitor, by the OBF tool, the application in the set of target servers.

Still another aspect of this description relates to a computer-readable medium. In some embodiments, the computer-readable medium includes instructions executable by a controller of a user equipment to cause the controller to perform operations including creating a first package of an application, the first package including at least deployment files of the application, Keycloak information for the application, daily management configurations of the application for a configuration management tool, or daily monitoring configurations for monitoring the application in an observability framework (OBF) tool, registering the first package with an orchestrator, triggering deployment of the application on a set of target servers, and in response to triggering deployment of the application, the orchestrator: obtaining client identification of the Keycloak information for the application, deploying the application on the set of target servers, submitting the daily configuration files to the configuration management tool for daily configuration, and applying, by the configuration management tool, the daily configuration files to perform daily configuration of the application in the set of target servers, and triggering the OBF tool to start application monitoring in response to the orchestrator submitting the daily monitoring configurations to the OBF tool, and monitoring, by the OBF tool, the application in the set of target servers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
creating, by a first processor, a first software package of an application, the first software package including at least deployment files of the application, security information for the application, management configurations of the application for a configuration management tool, and monitoring configurations for monitoring the application in an observability framework (OBF) tool;
registering the first software package with an orchestrator;
triggering, by a user, deployment of the application on a set of target servers; and
in response to triggering deployment of the application, the orchestrator:
obtaining client identification of the security information for the application;
deploying the application on the set of target servers;
submitting the configuration files to the configuration management tool for configuration, and applying, by the configuration management tool, the configuration files to perform configuration of the application in the set of target servers; and
triggering the OBF tool to start application monitoring in response to at least the orchestrator submitting the monitoring configurations to the OBF tool, and monitoring, by the OBF tool, the application in the set of target servers,
wherein the security information for the application includes Keycloak files.

2. The method of claim 1, wherein registering the first software package with the orchestrator comprises:
reviewing, by an administrator, the first software package; and
approving the first software package thereby triggering, by the user, deployment of the application on the set of target servers.

3. The method of claim 1, wherein obtaining, by the orchestrator, client identification of the security information for the application comprises:
extracting, by the orchestrator, client identity access management (IAM) data from the first software package, the client IAM data including at least a client type, a login page, a client name, a client description, an authorization protocol, redirect uniform resource locators (URLs) or a base URL;
creating a client for a security tool, by an application programming interface (API) call, wherein the API call includes metadata of the client IAM data; and
receiving, by the orchestrator, a first response message, the first message indicating the client identification.

4. The method of claim 3, wherein obtaining, by the orchestrator, client identification of the security information for the application further comprises:
storing, by the security tool, a client secret in a vault of the security tool;
creating, by the orchestrator, permissions and user roles for each corresponding user of the application in the security tool; and
receiving, by the orchestrator, a second response message, the second message indicating that the permissions and user roles for each corresponding user of the application in the security tool was successfully created in the security tool.

5. The method of claim 4, wherein deploying, by the orchestrator, the application on the set of target servers comprises:
adding the security information in initial configuration files of the application, and deploying the application and the initial configuration files of the application on the set of target servers; and
receiving, by the orchestrator, a third response message, the third message indicating that the application was successfully deployed on the set of target servers.

6. The method of claim 1, wherein submitting, by the orchestrator, the configuration files to the configuration management tool for the configuration and applying, by the configuration management tool, the configuration files to perform configuration of the application in the set of target servers comprises:
sharing, by the orchestrator, the configuration files with the configuration management tool;
generating, by the configuration management tool, extensible markup language (XML) files that are compatible with pushing files to the application;
establishing, by the configuration management tool, a connection with the application;
receiving, by the orchestrator, a first response message, the first message indicating that the connection between the configuration management tool and the application was successfully established;
pushing, by the orchestrator, the configuration files to the configuration management tool;
pushing, by the configuration management tool, the configuration files and the XML files to the application; and
receiving, by the orchestrator, a second response message, the second message indicating that the configuration files were successfully pushed to the application.

7. The method of claim 1, wherein triggering, by the orchestrator, the OBF tool to start application monitoring in response to the orchestrator submitting the monitoring configurations to the OBF tool, and monitoring, by the OBF tool, the application in the set of target servers comprises:
performing, by the orchestrator, an application programming interface (API) call request to on-board a network function into the OBF tool;
retrieving, by the OBF tool, target application metrics and log-in configuration files;
configuring, by the OBF tool, the application to start sending at least events or logs to the OBF tool;
receiving, by the OBF tool, the events from the application;

receiving, by the orchestrator, a first response message, the first message indicating that the application has started sending events to the OBF tool; and generating a first message to the user that the application was on-boarded successfully.

8. An apparatus, comprising:

a memory having non-transitory instructions stored; and a processor coupled to the memory, and being configured to execute the instructions, thereby causing the apparatus to:

create a first software package of an application, the first software package including at least deployment files of the application, security information for the application, management configurations of the application for a configuration management tool, and monitoring configurations for monitoring the application in an observability framework (OBF) tool;

register the first software package with an orchestrator;

trigger deployment of the application on a set of target servers; and in response to triggering deployment of the application, the orchestrator being configured to:

obtain client identification of the security information for the application;

deploy the application on the set of target servers;

submit the configuration files to the configuration management tool for configuration, and apply, by the configuration management tool, the configuration files to perform configuration of the application in the set of target servers; and trigger the OBF tool to start application monitoring in response to the orchestrator submitting the monitoring configurations to the OBF tool, and monitor, by the OBF tool, the application in the set of target servers, wherein the security information for the application includes Keycloak files.

9. The apparatus of claim 8, wherein the instructions that cause the apparatus to register the first software package with the orchestrator comprises, the processor is further configured to cause the apparatus to:

review the first software package; and approve the first software package.

10. The apparatus of claim 8, wherein the instructions that cause the apparatus to obtain, by the orchestrator, client identification of the security information for the application, the processor is further configured to cause the apparatus to:

extract, by the orchestrator, client identity access management (IAM) data from the first software package, the client IAM data including at least a client type, a login page, a client name, a client description, an authorization protocol, redirect uniform resource locators (URLs) or a base URL;

create a client for a security tool, by an application programming interface (API) call, wherein the API call includes metadata of the client IAM data; and receive, by the orchestrator, a first response message, the first message indicating the client identification.

11. The apparatus of claim 10, wherein the instructions that cause the apparatus to obtain, by the orchestrator, client identification of the security information for the application, the processor is further configured to further cause the apparatus to:

store, by the security tool, a client secret in a vault of the security tool;

create permissions and user roles for each corresponding user of the application in the security tool; and receive, by the orchestrator, a second response message, the second message indicating that the permissions and user roles for each corresponding user of the application in the security tool was successfully created in the security tool.

12. The apparatus of claim 11, wherein the instructions that cause the apparatus to deploy, by the orchestrator, the application on the set of target servers, the processor is further configured to cause the apparatus to:

add the security information in initial configuration files of the application, and deploy the application and the initial configuration files of the application on the set of target servers; and receive, by the orchestrator, a third response message, the third message indicating that the application was successfully deployed on the set of target servers.

13. The apparatus of claim 8, wherein the instructions that cause the apparatus to submit, by the orchestrator, the configuration files to the configuration management tool for the configuration and apply, by the configuration management tool, the configuration files to perform configuration of the application in the set of target servers, the processor is further configured to cause the apparatus to:

share, by the orchestrator, the configuration files with the configuration management tool;

generate, by the configuration management tool, extensible markup language (XML) files that are compatible with pushing files to the application;

establish, by the configuration management tool, a connection with the application;

receive, by the orchestrator, a first response message, the first message indicating that the connection between the configuration management tool and the application was successfully established;

push, by the orchestrator, the configuration files to the configuration management tool;

push, by the configuration management tool, the configuration files and the XML files to the application; and receive, by the orchestrator, a second response message, the second message indicating that the configuration files were successfully pushed to the application.

14. The apparatus of claim 8, wherein the instructions that cause the apparatus to trigger, by the orchestrator, the OBF tool to start application monitoring in response to the orchestrator submitting the monitoring configurations to the OBF tool, and monitor, by the OBF tool, the application in the set of target servers, the processor is further configured to cause the apparatus to:

perform, by the orchestrator, an application programming interface (API) call request to on-board a network function into the OBF tool;

retrieve, by the OBF tool, target application metrics and log-in configuration files;

configure, by the OBF tool, the application to start sending at least events or logs to the OBF tool;

receive, by the OBF tool, the events from the application;

receive, by the orchestrator, a first response message, the first message indicating that the application has started sending events to the OBF tool; and generate a first message to the user that the application was on-boarded successfully.

15. A computer-readable medium including instructions executable by a controller of a user equipment to cause the controller to perform operations comprising:

creating a first software package of an application, the first software package including at least deployment files of the application, security information for the application, management configurations of the application for a configuration management tool, and monitoring configurations for monitoring the application in an observability framework (OBF) tool;

registering the first software package with an orchestrator;

triggering deployment of the application on a set of target servers; and in response to triggering deployment of the application, the orchestrator:

obtaining client identification of the security information for the application;

deploying the application on the set of target servers;

submitting the configuration files to the configuration management tool for configuration, and applying, by the configuration management tool, the configuration files to perform configuration of the application in the set of target servers; and triggering the OBF tool to start application monitoring in response to the orchestrator submitting the monitoring configurations to the OBF tool, and monitoring, by the OBF tool, the application in the set of target servers, wherein the security information for the application includes Keycloak files.

16. The computer-readable medium of claim 15, wherein obtaining, by the orchestrator, client identification of the security information for the application comprises:

extracting, by the orchestrator, client identity access management (IAM) data from the first software package, the client IAM data including at least a client type, a login page, a client name, a client description, an authorization protocol, redirect uniform resource locators (URLs) or a base URL;

creating a client for a security tool, by an application programming interface (API) call, wherein the API call includes metadata of the client IAM data; and receiving, by the orchestrator, a first response message, the first message indicating the client identification.

17. The computer-readable medium of claim 16, wherein obtaining, by the orchestrator, client identification of the security information for the application further comprises:

storing, by the security tool, a client secret in a vault of the security tool;

creating permissions and user roles for each corresponding user of the application in the security tool; and receiving, by the orchestrator, a second response message, the second message indicating that the permissions and user roles for each corresponding user of the application in the security tool was successfully created in the security tool.

18. The computer-readable medium of claim 17, wherein deploying, by the orchestrator, the application on the set of target servers comprises:

adding the security information in initial configuration files of the application, and deploying the application and the initial configuration files of the application on the set of target servers; and receiving, by the orchestrator, a third response message, the third message indicating that the application was successfully deployed in the set of target servers.

19. The computer-readable medium of claim 15, wherein submitting, by the orchestrator, the configuration files to the configuration management tool for the configuration and applying, by the configuration management tool, the configuration files to perform configuration of the application in the set of target servers comprises:

sharing, by the orchestrator, the configuration files with the configuration management tool;

generating, by the configuration management tool, extensible markup language (XML) files that are compatible with pushing files to the application;

establishing, by the configuration management tool, a connection with the application;

receiving, by the orchestrator, a first response message, the first message indicating that the connection between the configuration management tool and the application was successfully established;

pushing, by the orchestrator, the configuration files to the configuration management tool;

pushing, by the configuration management tool, the configuration files and the XML files to the application; and receiving, by the orchestrator, a second response message, the second message indicating that the configuration files were successfully pushed to the application.

20. The computer-readable medium of claim 15, wherein triggering, by the orchestrator, the OBF tool to start application monitoring in response to the orchestrator submitting the monitoring configurations to the OBF tool, and monitoring, by the OBF tool, the application in the set of target servers comprises:

performing, by the orchestrator, an application programming interface (API) call request to on-board a network function into the OBF tool;

retrieving, by the OBF tool, target application metrics and log-in configuration files;

configuring, by the OBF tool, the application to start sending at least events or logs to the OBF tool;

receiving, by the OBF tool, the events from the application;

receiving, by the orchestrator, a first response message, the first message indicating that the application has started sending events to the OBF tool; and generating a first message to the user that the application was on-boarded successfully.

* * * * *